United States Patent [19]

Meinert et al.

[11] E Patent Number: Re. 32,220

[45] Reissued Date of Patent: Aug. 5, 1986

[54] LANCE MOUNTED SPRAY APPARATUS

[75] Inventors: Leo L. Meinert, Baden; Nicholas M. Rymarchyk, Wexford, both of Pa.

[73] Assignee: Pullman Berry Co., Harmony, Pa.

[21] Appl. No.: 637,888

[22] Filed: Aug. 6, 1984

Related U.S. Patent Documents

Reissue of:

[64] Patent No.: 4,386,763
Issued: Jun. 7, 1983
Appl. No.: 309,646
Filed: Oct. 8, 1981

[51] Int. Cl.[4] ..... C21C 5/32

[52] U.S. Cl. ..... 266/158; 75/59.25; 266/144; 266/225

[58] Field of Search ..... 266/158, 144, 225; 75/59.25

[56] References Cited

U.S. PATENT DOCUMENTS 4,294,432 10/1981 Blair ..... 75/59.25

*Primary Examiner*—Peter D. Rosenberg
*Attorney, Agent, or Firm*—Richard J. Myers & Assoc.

[57] ABSTRACT

A lance for use in a basic oxygen vessel is provided with a fluid cooling arrangement which is mounted directly on the lance structure and which is vertically adjustable therewith to provide a fluid spray which effectively enables and ensures cooling and suppression of the exiting gas before it contacts the hood and moves into the ducts of the hood structure.

15 Claims, 10 Drawing Figures

36
17
27'
26
27
19
18
23
16
21
22
24
16
34
14
17
35
12
25
26
6
17
27
6
13
11
26
3
3
27
28
14
15
10
15

34
26
17

5
28
33'
5
29
32'
30
33
31
26
33'

31'
31
29
33
32'
28
30
32

FIG. 7
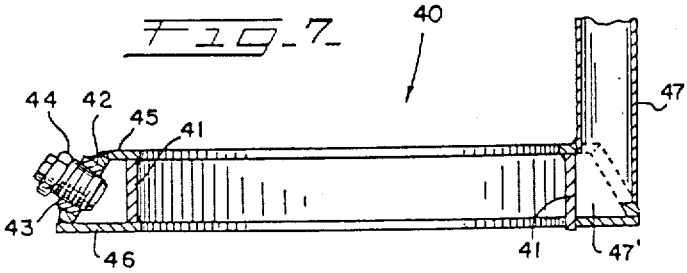
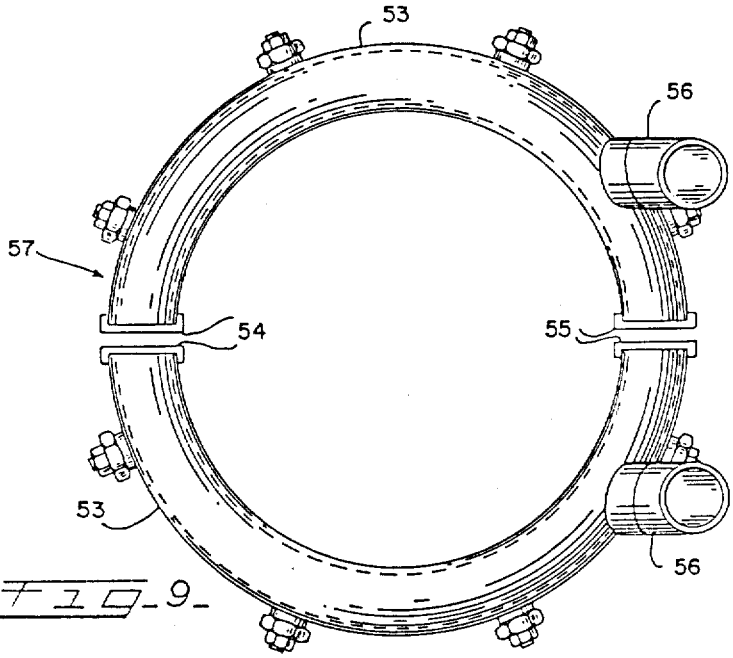
FIG. 9
FIG. 8
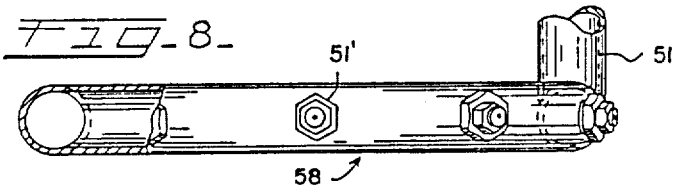

LANCE MOUNTED SPRAY APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention broadly relates to the field of Basic Oxygen Furnace steelmaking and more specifically to a lance structure and hood arrangement wherein the lance is vertically adjustable in relation to the mouth of the vessel and supports a cooling spray arrangement to cool and suppress exiting gas from the vessel.

2. Description of the Prior Art

The prior art includes the McFeaters Pat. No. 3,026,102 which relates to B.O.F. operation and is provided with a hood structure having a double wall cooling duct arrangement, as well as a spray ring which sprays cooling fluids into the hood for cooling purposes. The Stone Pat. No. 3,418,109 discloses a baffle arrangement which regulates the fumes emanating from the mouth of a B.O.F. vessel. The baffle arrangement is mounted on the lance and includes a water cooling system which is a closed system for cooling the baffle.

The Baillie Pat. No. 3,380,738 discloses a hood over a steel-making vessel which has attached thereto a cooling ring for the purpose of cooling the hood portion, this construction being a closed system.

The present invention is not suggested by constructions of this type in that it relates to a cooling and suppression system for fumes emanating from the B.O.F. vessel by the utilization of a lance mounted spray ring and standpipe assembly.

SUMMARY OF THE INVENTION

A B.O.F. process generally includes a hood and duct system which is mounted over the mouth of a furnace or converter. The process includes a lance which may be vertically adjusted by suitable hoist means and which among other means will deliver oxyen into the vessel during the process, which of course is well known in the art.

The fumes and gases emanating from the vessel through its mouth end are carried away through the hood and duct system which is disposed over the converter.

The high heat levels generated during the blowing process decreases the life of the hood and its components. Also, initially upon blowing all the fumes are unable to be collected. Spray devices against the hood structure have not entirely solved the problem and therefore the present invention is primarily concerned with a specific location and orientation of water spray with a volume of water which effectively enables and ensures cooling and suppression of fumes of the off-gas before it contacts the surfaces of the hood and before it moves to the upper ducts of the hood structure. The present system thus provides ample low cost water in the early and hottest off-gas where it can easily and quickly generate into steam and where the off-gas can absorb moisture to a greater extent and at higher levels with greater potential for carry-over throughout the complete gas cleaning system.

Further, the present system suppresses fugitive emissions that were previously unable to be collected and puts moisture in the off-gases to enhance the operation of the dust collection system located downstream of the hood structure.

This is achieved by the present invention wherein the spray system includes a spray ring which is mounted directly over the outer pipe of the oxygen lance.

The position of the spray ring on the lance is dictated by the process conditions of each individual operation. The present invention is relatively inexpensive easily operated and easily maintained. The basic system includes a source of water at sufficient pressure which flows through a swivel connection to a flexible hose which is connected by means of a pipe fitting directly to a standpipe in turn mounted on the outer peripheral edge surface of a lance conventional to B.O.F. vessel operations. The standpipe is supported on the lance in a manner to accommodate the standpipes freely independently of the thermal expansion lance during the B.O.F. operation. A spray ring is attached to the standpipe and encircles the perimeter of the oxygen lance. Spray nozzles are arranged around the circumference of the spray ring and are adapted to spray the fumes and gases emanating from the B.O.F. vessel. The optimum distance of the spray ring from the lower end of the hood may be 2 to 3 feet which positioning of course is dictated by the process conditions of the individual operation in which the system is being used.

The spray ring will accommodate nozzles of various types which may be readily adjusted as to flow rates as well as spray pattern. The position, of the spray rings depending on the operation can of course be altered to secure optimum results, this being possible since the spray ring mounted on the lance can be so positioned at various points along the lance body. The spray rings also are of various constructions including multiple rings, different nozzles, spray patterns and combination thereof which may be desired for a particular B.O.F. operation.

BRIEF DESCRIPTION OF THE DRAWINGS

FIG. 7 is a plan view of a modified construction of a spray ring;

FIG. 8 is a plan view of a modified construction of a spray ring;

FIG. 9 is another modified construction of a spray ring; and

DESCRIPTION OF THE PREFERRED EMBODIMENT

Figures 1, 2, 3:
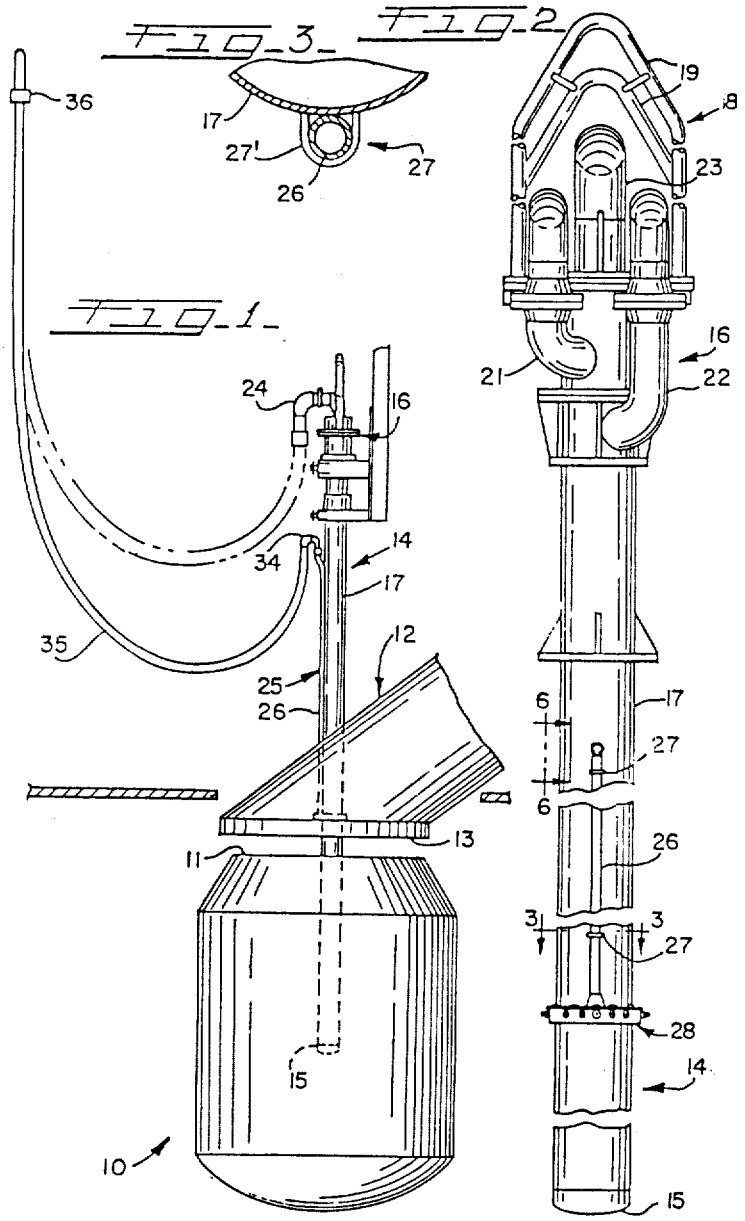
FIG. 1, is a schematic view of a B.O.F. vessel, lance, and fluid distribution and cooling structure.
FIG. 2 is a side elevational view of a B.O.F. lance assembly including a fluid distribution system mounted thereon.
FIG. 3 is a cross-sectional view taken along the line 3—3 of FIG. 2.

A basic oxygen furnace combination 10 is disclosed in FIG. 1. The furnace or vessel 10 includes a mouth 11 at its upper end which is disposed beneath a hood and duct structure 12. The hood and duct structure 12 includes a conventional open bottom hood 13 disposed over the mouth 11 of the furnace 10. The system is also readily compatible with a closed duct system as well. A conventional oxygen lance 14 includes a nozzle or tip structure 15 and an adapter structure 16 at the upper end of the lance.

The B.O.F. lance structure is well known in the art and includes an outer pipe, and associated pipes (not shown) which are supported at their upper ends by a suitable bail structure 18 which includes bail hooks 19. A hoisting means 20 raises and lowers the lance 14 relative to the mouth end of the vessel 10. The lance 14 is provided at its upper end with a water supply conduit connection 21, water return conduit connection 22 and oxygen conduit connection 23. The oxygen connection 23 is adapted to carry oxygen from an oxygen hose 24 and the water supply and return connections are also connected to suitable source and return means. A fluid distribution system is designated at 25 and includes a vertical standpipe 26 which by means of multitude of fastener brackets 27 support the standpipe 26 on the outer periphery of the outer pipe 17. The outer pipe 17 of lance 14 and the standpoint 26 are subjected to heat which provide for differential thermal lengthwise expansion, such differences in expansion are accommodated for by the fastener brackets 27 which are provided with cylindrical eyes 27', in FIG. 3 which permit such expansion and yet effectively secure the standpipe 26 and spray ring 28 in the functional manner disclosed.

Figures 4, 5, 6:
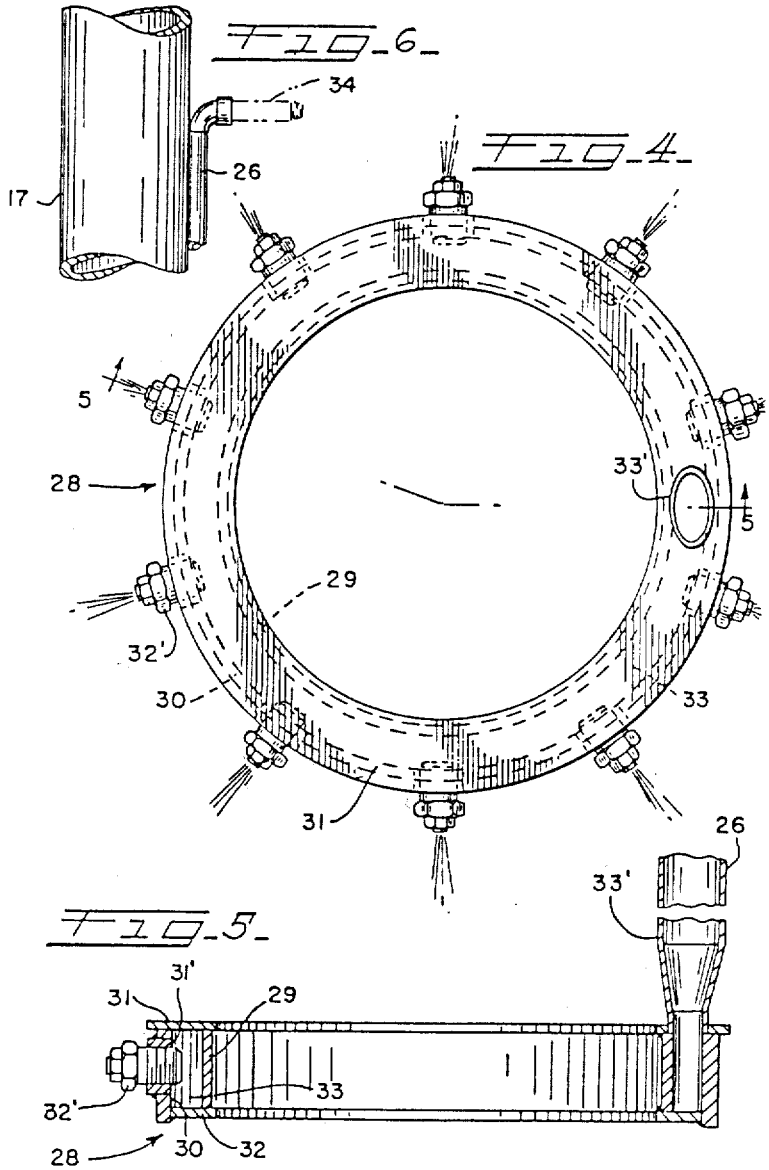
FIG. 4 is a plan view, partially in section of a fluid distribution or spray ring.
FIG. 5 is a cross-sectional view taken along the line 5—5 of FIG. 4.
FIG. 6 is a cross-sectional view taken along the line 6—6 of FIG. 2.

One type of spray ring 28 is disclosed in FIG. 4 and includes an inner cylindrical vertical wall 29 and an outer cylindrical vertical wall 30 secured by a top wall 31 and a bottom wall 32. The walls 29 and 30 with walls 31 and 32 provide a cylindrical manifold 33 which is in communication with an oval pipe stub portion 33' in turn communicating with the standpoint 26. The wall 30 includes a plurality of threaded openings 31' which support threaded nozzles 32'. The nozzles 32' may be of conventional design which are adjustable in connection with spray quantity and direction.

Referring to FIG. 6, a nipple 34 is connected to the standpipe 26 and is in turn in communication with a flexible hose 35 connected to a swiveling conduit means 36, in turn connected to a suitable source of coolant water. The water source is of course provided with necessary pressure and control devices (not shown) for delivering the desired stream of liquid as required.

FIG. 7 discloses a modified spray ring design 40 which includes a vertical inner wall 41, an outer diagonal wall 42, and upper and lower walls 45 and 46. The diagonal wall includes a threaded opening 43 which removably supports a spray nozzle 44, a number of which are suitably supported in circumferential relation around the ring 40. A standpipe 47 provides fluid to the manifold or space 47' of the ring 40. FIG. 8 discloses a pipe ring 58 and standpoint connection 51 which includes sufficient peripherally spaced openings for supporting nozzles 51'. FIG. 9 discloses a ring 52 consisting of two segments 53 which have adjacent spaced ends closed by means of caps 54 and 55. These rings include the spray nozzles and will be supported about the lance and in manner hereinbefore described. The segments 53 include water-in connection 56.

Figure 10:
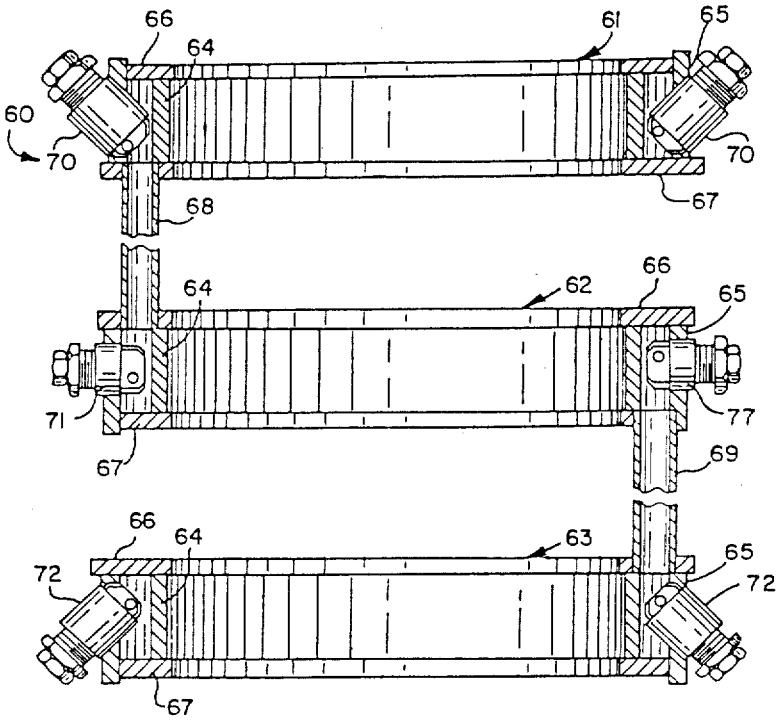
FIG. 10 is a further modified construction of a spray ring.

FIG. 10 discloses a modified spray ring design 60 which includes 3 spray rings 61, 62, 63 spaced along the vertical axes of the lance body. Each spray ring has inner walls 64, outer walls 65, upper and lower walls 66 and 67. A fluid conduit 68 provides a fluid path for fluid to move from spray ring 61 to spray ring 62. A further fluid conduit 69 provides a fluid path from spray ring 62 to spray ring 63.

Removable thread nozzles 70, 71, 72 are supported in the outer walls 65 of the spray rings 61, 62, 63, respectively. Nozzles 70 are positioned to spray at an angle above the horizontal. Nozzles 71 are positioned to spray horizontally, while Nozzles 72 are positioned to spray at an angle below the horizontal.

There are various methods of achieving different spray patterns, i.e., by multiple spray rings, nozzles spraying at different angles, placement of nozzles along the spray ring, and any combination thereof. The various figures illustrated and described above are merely used to illustrate and disclose their invention and in no way are intended to be limited thereby.

THE OPERATION

The location of the spray ring assembly upon the lance body is dictated by the specific operating conditions and needs of each individual B.O.F. plant. The following considerations should be a part of the parameter in every operation:

(1) The water spray ring must be with the hood and not lower then the bottom level of the hood when the lance is in the lowest blowing position of the lance practice with a worn (eroded refractory) vessel;

(2) The water spray ring must be within the hood at a highest level two to three (2 to 3) feet below the lowest level of the hood lance opening, such level that the water spray will not impinge on the inner surfaces of the hood panels—when water flow is initiated and when the lance is in its highest blowing position at the time of ignition; and (3) The water spray ring must be positioned within the hood so that water spray does not impinge on the vessel lip, refractory walls or slag coating.

The spray ring unit is made to fit and weld to the lance body with the water feed standpipe held to the lance body by the weld-mounted "U" clamps as disclosed in the drawings permitting the standpipe to expand and contract freely and independently of the lance body. Thus, the mounting procedure used for this spray ring provides for a stress-free installation.

Once the location of the spray ring assembly is ascertained in accordance with the above parameters and individual process conditions and is mounted, the assembly is ready for use.

Various designs of spray rings providing for various spray patterns have been employed. Further, the spray rings may be of any wall configuration employing interchangeable nozzles providing for the greatest flexibility in adapting to various process conditions. The use of split spray rings and/or multiple spray rings at different levels can also be used to adapt the system to any B.O.F. operation.

The present invention provides a lower heat load to the hood upper ducts, a suppression of observable, initial and on-going fumes, a reduction in total volume of water use, a reduction in steam use, conditioning the off-gases with moisture to aid in downstream dust collection. In short, this sytem presents the means of increasing the overall efficiency and effectiveness of the off-gas system, and provides a method of increasing the life of associated components.

The foregoing description and drawings merely explain and illustrate the invention and the invention is not so limited to the various spray ring designs and spray patterns suggested, as those skilled in the art who have the disclosure before them will be able to make modifications and variations thereof without departing from the scope of the invention.

What is claimed is:

1. [For] *In* a steelmaking [operation] *apparatus* including a metal refining vessel having an upper open mouth portion normally positioned upwardly and receiving a vertically moveable gas blowing lance, *and* means for moving said lance relative to said vessel through said mouth portion, *and* a hood and duct structure including a hood portion disposed over said mouth portion for gathering fumes emanating from said vessel, *and* said hood duct having opening means accommodating movement of said lance [the improvement comprising], *and* a cooling fluid distribution means supportd on said lance for movement therewith and being constructed and arranged to direct cooling fluid into contact with the fumes emanating from said vessel, *and* said cooling fluid distribution means comprising a spray ring assembly adapted to direct streams of fluid in a generally outward direction, *and* said spray ring assembly including a plurality of nozzles, *and* a manifold member supporting said nozzles to direct fluids outwardly from said manifold member for suppressing and cooling of gases emanating from said vessel, *and*

[said plurality of nozzles being interchangeable to achieve a variety of different spray patterns and flow rates,]

[including] *the improvement comprising* means for supporting said [spry] *spray* ring *assembly* on said lance for accommodating lengthwise thermal expansion of said lance relative to said spray ring.

2. The invention in accordance with claim 1, said spray ring supporting means supporting a vertically extending conduit communicating with said manifold.

3. The invention in accordance with claim 2, including bracket means connecting said conduit to the outer pipe portion of said lance.

4. The invention in accordance with claim 3, said bracket means including a ring shaped portion encircling said conduit.

[5. For a steelmaking operation including a metal refining vessel having an upper open mouth portion normally positioned upwardly and receiving a vertically moveable gas blowing lance, means for moving said lance relative to said vessel through said mouth portion, a hood and duct structure including a hood portion disposed over said mouth portion for gathering fumes emanating from said vessel, said hood and duct having opening means accommodating movement of said lance the improvement comprising, a cooling fluid distribution means supported on said lance for movement therewith and being constructed and arranged to direct cooling fluid into contact with the fumes emanating from said vessel, said cooling fluid distribution means comprising a ring shaped housing, means for supporting said ring shaped housing with said ring shaped housing encircling said lance, and said housing support means accommodating lengthwise thermal expansion of said lance and said cooling fluid distribution means independently of one another.]

[6. The invention in accordance with claim 5, said housing support means including a pipe communicating with said ring shaped housing.]

[7. The invention in accordance with claim 6, said ring shaped housing including an inner wall, an outer wall, and upper and lower walls connected to form a cylindrical manifold, and nozzles spaced on said walls of said manifold.]

[8. The invention in accordance with claim 7, said nozzles being interchangeable to achieve a variety of different spray patterns and flow rates.]

[9. The invention in accordance with claim 8, said nozzles being placed at various angles at various spots along the exterior of said ring shaped housing.]

[10. The invention in accordance with claim 5, said ring shaped housing comprising a cylindrical pipe and said housing support means supporting a vertical standpipe connected to said cylindrical pipe.]

11. The invention in accordance with claim [5] *1*, said *assembly including a* ring shaped housing comprising a plurality of semi-cylindrical segments having closed facing end portions on opposite sides of said lance, and each segment including a vertically extending water inlet connection.

12. [For] *In* a steelmaking [operation] *apparatus* including a metal refining vessel having an upper open mouth portion normally positioned upwardly and receiving a vertically moveable gas blowing lance, *and* means for moving said lance relative to said vessel through said mouth portion, *and* a duct structure including a hood portion disposed over said mouth portion for gathering fumes emanating from said vessel, *and* said hood and duct having opening means accommodating movement of said lance [the improvement comprising], *and* a cooling fluid distribution means supported on said lance for movement therewith and being constructed and arranged to direct cooling fluid into contact with the fumes emanating from said vessel, said cooling fluid distribution means comprising a plurality of ring shaped housings and defining upper, middle and lower housings spaced along the vertical axis of said lance,

*the improvement comprising* means for supporting said ring shaped housings on said lance with said housings encircling said lance, and said housings support means accommodating lengthwise thermal expansion of said lance and said cooling fluid distribution means independently of one another.

[13. The invention in accordance with claim 12, said plurality of ring shaped housings including a plurality of interchangeable nozzles.]

[14. The invention in accordance with claim 13, said plurality of nozzles being placed at various angles at various spots along the exterior of each of said ring shaped housing.]

[15. The invention in accordance with claim 14, each of said ring shaped housings including an inner wall, an outer wall, and upper and lower walls connected to form a cylindrical manifold.]

16. The invention in accordance with claim [15] *12*, wherein each of said upper and middle housings are provided with an inlet and an outlet, the outlet being [located diametrically] *spaced* opposite to the inlet, and said lower housing is provided with an inlet disposed [diametrically] opposite to the outlet of the middle housing, said cooling distribution means comprising a plurality of conduits one conduit having one end connected to the inlet of said upper housing and the other end adapted to be connected to a source cooling fluid, a second conduit interconnected between the outlet of the upper housing and the inlet of the middle housing, and a third conduit interconnected between the outlet of said middle housing and the inlet of said lower housing.

17. The invention in accordance with claim 16, wherein the outer walls of said housings support a plurality of nozzles, the axes of the nozzles supported by the upper housing being directed angularly upwardly, the axes of the nozzles supported by the middle housing extending radially outwardly and the axes of the nozzles supported by the lower housing being directed angularly downwardly whereby the sprayed cooling fluid defines a wide annulus for intercepting gases formed during blowing operation.

18. A lance for introducing oxygen to a basic oxygen furance having a water-cooled tubular portion with a discharge end, said portion adapted to extend downwardly through a hood and duct structure into the furnace, a ring-like spray nozzle supporting manifold encircling said lance portion, and conduit means connected to said manifold for providing water to said manifold, the improvement comprising a segmented manifold, each manifold segment having substantially a semicircular configuration, and said conduit means comprising a pair of vertically extending pipes, each pipe associated with one of the manifold segments and conducting water to said manifold segment.

19. A lance according to claim 18, wherein each manifold segment comprises an open-ended conduit, and a pair of terminations sealing said open ends, whereby the terminated conduits encircle said lance portion and abut each other.

20. A lance according to claim 19, including means for freely and independently securing said conduit means to said lance portion, whereby said conduit means, when subjected to thermal stresses, can expand along the lance portion.

21. A lance according to claim 20, wherein said securing means comprise a plurality of fastener brackets secured to said lance portion, said brackets defining enclosure openings adapted to non-rigidly support said conduit means, thereby permitting said conduit means to move with respect to said lance portion.

22. In a lance for introducing oxygen to a basic oxygen furnace, said lance having a lower portion provided with water spray means, conduit means connected to said spray means and extending along said lower portion of said lance, and means securing said conduit means to said lower portion of said lance, the improvement wherein said securing means comprises a plurality of support members non-rigidly contacting said conduit means, whereby said conduit means is free to move with respect to said lower portion of the lance as a result of thermal stressing.

23. In a lance according to claim 22, wherein each support member defines an opening for receiving said conduit means.

24. In accordance with claim 23, wherein said plurality of support members comprises a pair of brackets, wherein one bracket is secured to the lance at its upper end and the other bracket is secured to the lance a short distance above said spray means.

* * * * *